Feb. 2, 1971   KOKICHI YOTSUMOTO   3,560,131
FILTER ELEMENT
Filed Dec. 31, 1968   2 Sheets-Sheet 1
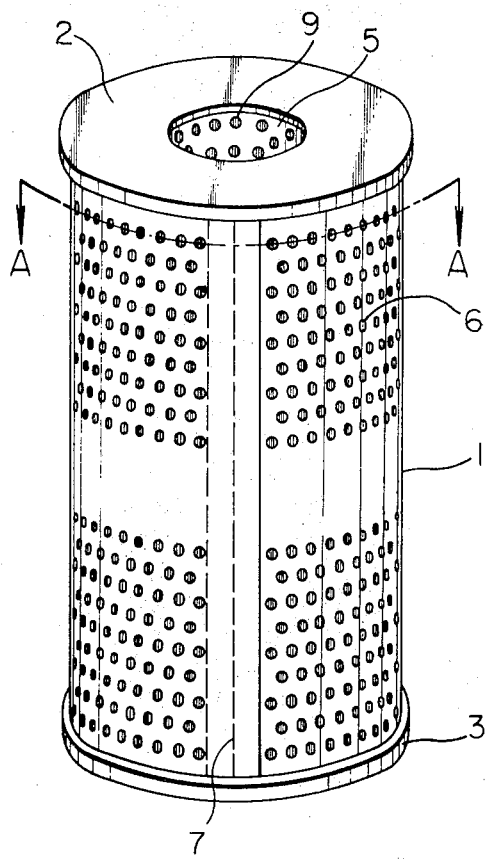
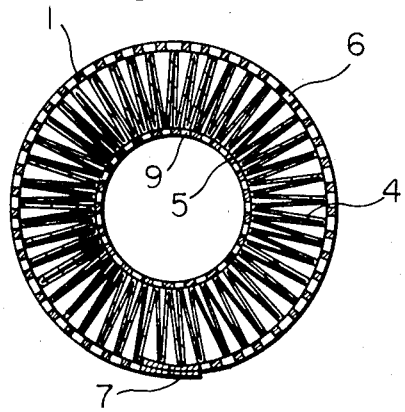
KOKICHI YOTSUMOTO,
INVENTOR
BY Wenderoth, Lind &
Ponack   ATTORNEYS Feb. 2, 1971   KOKICHI YOTSUMOTO   3,560,131
FILTER ELEMENT
Filed Dec. 31, 1968   2 Sheets-Sheet 2
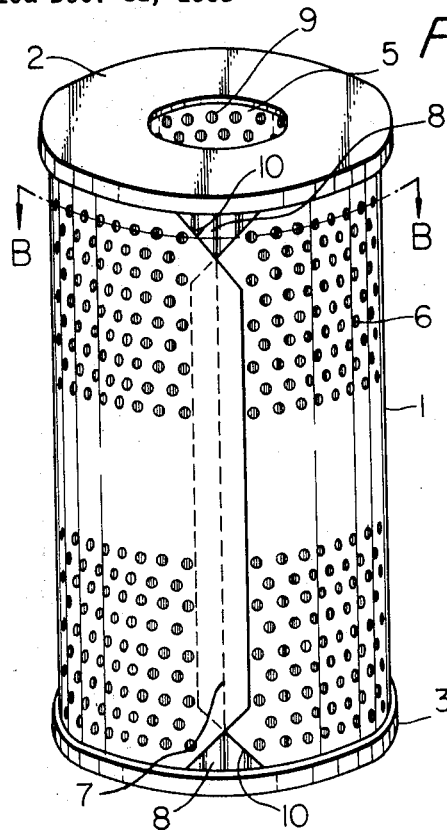
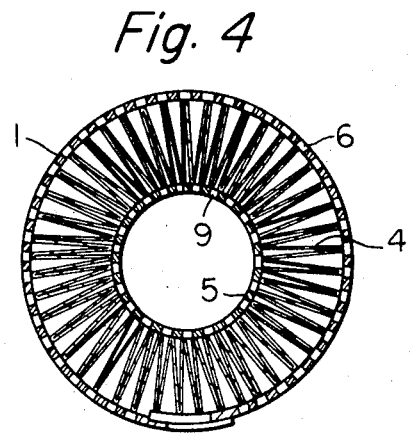
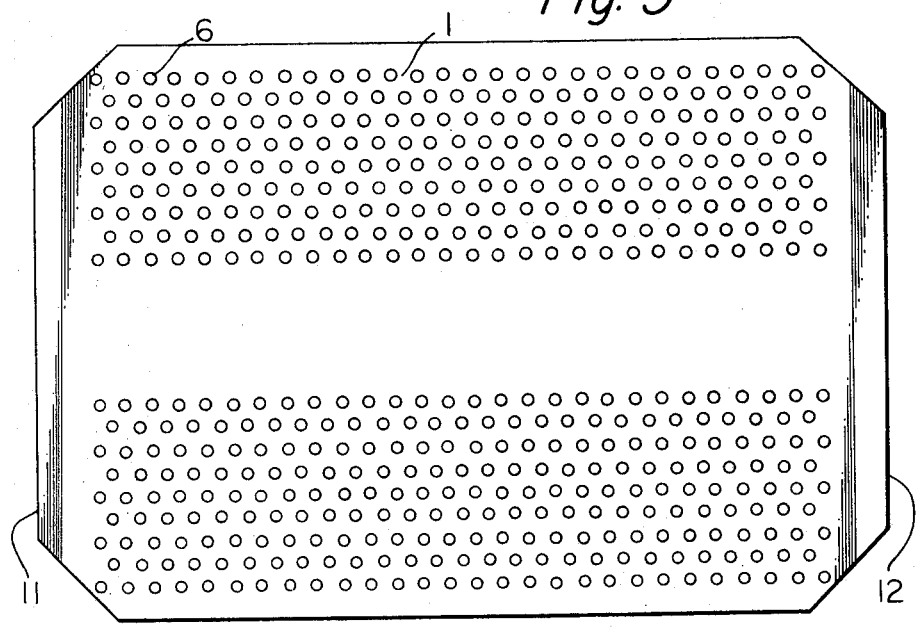
KOKICHI YOTSUMOTO,
INVENTOR
BY Wenderoth, Lind &
Ponack   ATTORNEYS

3,560,131
FILTER ELEMENT
Kokichi Yotsumoto, Sagamihara-shi, Japan, assignor to Caterpillar Mitsubishi Ltd., Tokyo, Japan
Filed Dec. 31, 1968, Ser. No. 788,242
Claims priority, application Japan, Jan. 11, 1968, 43/1,264
Int. Cl. B01d 27/08
U.S. Cl. 210—484                4 Claims

ABSTRACT OF THE DISCLOSURE

A filter element having an outer wrapper, and improvement wherein openings are provided at the upper and lower ends of the joint of the outer wrapper.

---

This invention relates to a filter element for use in internal combustion engines, and particularly to a filter element comprising an outer wrapper and a filter paper wherein upper and lower ends of the joint of the outer wrapper have openings.

In the accompanying drawings, FIG. 1 is a rough elevation of a conventional filter element; FIG. 2 is a sectional view taken along the line A—A of FIG. 1; FIG. 3 is a rough elevation showing one embodiment of the invention; FIG. 4 is a sectional view taken along the line B—B of FIG. 3; and FIG. 5 is a plan view of the outer wrapper material of the invention.

The conventional filter element comprises, as shown in FIGS. 1 and 2, an outer wrapper 1 having a plurality of small apertures 6, an upper end plate 2, a lower end plate 3, a convoluted filter paper 4 and a center tube 5 containing a plurality of small apertures 9. The filter element of the invention may be used as an oil filter element, a fuel filter element, a hydraulic filter element or an air cleaner element. Considering the oil filter element application, oil enters through apertures 6 in the outer wrapper and comes into contact with the outside of the filter paper 4. The oil is filtered by passing through pores in the filter paper and passes through apertures 9 and into the inside of the center tube 5. The collected dust is deposited on the outer surface of the filter paper. Conventional filter elements of this type have two defects which result from the absence of small apertures in the joint (seamed part) 7 of the outer wrapper 1. One of these defects is that the portion of the filter paper is situated just beneath joint 7 collects very little dust due to a lessened oil flow which results from the aforesaid absence of apertures in the joint which results in the effective area of the filter paper as a whole being decreased. Other defect is that the filter paper convolutions or pleats have a tendency to be pushed together at one point due to the nonuniform distribution of hydraulic pressure about the filter paper which is caused by the absence of apertures in the joint.

An object of the invention is to provide a filter element which is free from the foregoing defects.

The filter element of the present invention, as shown in FIGS. 3 and 4, comprises an outer wrapper 1 having notched portions 10 at upper and lower ends of a joint 7, an upper end plate 2 and a lower end plate 3 fitted respectively to the upper and lower ends of said outer wrapper 1, a cylindrical center tube 5 disposed inside the outer wrapper 1, and a convoluted filter paper 4 interposed between said outer wrapper 1 and said center tube 5, whereby an opening 8 for the filter paper is formed at both the upper and lower ends of a joint 7 of the outer wrapper 1. The size of the opening 8 can be optionally determined, and its shape may be polygonal or circular, a triangular shape being preferred. The cylindrical outer wrapper 1 having triangular notched portions 10 at both upper and lower ends of the joint 7 for forming a triangular opening 8, as shown in FIG. 5, can be easily made by cutting the four corners of a rectangular outer wrapper material in triangular form, and sewing opposite sides 11 and 12 together.

The advantages of the filter element of this invention are that the effective filtering area is increased markedly as compared to a conventional filter element due to the increased flow of the oil through opening 8 into that portion of the filter paper which is beneath the joint. In addition, because of a uniform distribution of hydraulic pressure at any time of in-flow of oil, the deviation of the convolutions of the filter paper is prevented.

According to the results of the test which has been made on test equipment specified by the Society of Automotive Engineers in specification SAE J806, the accumulated dust on the convolutions, at a pressure difference of 0.7 kg./cm.$^2$ across the conventional element and a flow rate of 50 liters/min., weighed 90 to 100 gm., while in the case of the improved element it weighed 110 to 120 gm.

This is mainly due to the fact that the oil had uniform access to the convolutions which increased the effective filtering area which, in turn, extended the change period of the element by 10 to 30%.

What is claimed is:

1. In a filter element having an outer wrapper of generally rectangular form having opposite sides fastened together in an overlapping joint to form a cylinder defining an upper and a lower open end, a center tube disposed within said cylinder, a convoluted filter paper interposed between said outer wrapper and said center tube, an upper end plate and a lower end plate fitted respectively to the upper and lower ends of said outer wrapper, a plurality of apertures in said outer wrapper and said center tube, the improvement wherein, the sides of said outer wrapper in the area of said joint being cut away such that the upper and lower ends of said joint have openings therein.

2. A filter element as claimed in claim 1 wherein said openings are triangular in shape.

3. A filter element as claimed in claim 1 wherein said openings are polygonal in shape.

4. A filter element as claimed in claim 1 wherein said openings are circular in shape and of greater size than an aperture of the outer wrapper and wherein said opposite sides are sewn together.

References Cited
UNITED STATES PATENTS

| | | | |
|---|---|---|---|
| 2,341,097 | 2/1944 | Heebink | 210—489X |
| 2,677,466 | 5/1954 | Lowe | 210—489 |
| 3,198,336 | 8/1965 | Hislop | 210—493X |
| 3,252,403 | 5/1966 | Polizzi | 210—484X |
| 3,310,177 | 3/1967 | Briggs et al. | 210—493X |
| 3,353,457 | 11/1967 | Whittingham et al. | 210—484X |

JOHN ADEE, Primary Examiner

U.S. Cl. X.R.

210—489, 493